United States Patent
Chen (10) Patent No.: US 10,527,885 B2
(45) Date of Patent: Jan. 7, 2020

(54) DISPLAY DEVICE WITH OPTICAL REFLECTING LAYER FOR REDUCTION OF SCREEN DOOR EFFECT

(71) Applicant: Facebook Technologies, LLC, Menlo Park, CA (US)

(72) Inventor: Dong Chen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/013,741

(22) Filed: Jun. 20, 2018

(65) Prior Publication Data

US 2019/0302524 A1    Oct. 3, 2019

Related U.S. Application Data

(60) Provisional application No. 62/652,171, filed on Apr. 3, 2018.

(51) Int. Cl.
   *G02F 1/1335*    (2006.01)
   *G02F 1/1368*    (2006.01)

(52) U.S. Cl.
   CPC .. *G02F 1/133553* (2013.01); *G02F 1/133512* (2013.01); *G02F 1/133514* (2013.01); *G02F 1/133516* (2013.01); *G02F 1/1368* (2013.01); *G02F 2001/133519* (2013.01); *G02F 2001/133562* (2013.01); *G02F 2201/52* (2013.01)

(58) Field of Classification Search
   CPC ......... G02F 1/133553; G02F 1/133516; G02F 1/133512; G02F 1/133514; G02F 1/1368

USPC ..... 257/72, 88, E21.532; 313/111, 114, 506; 359/230, 295, 853, 868; 438/29, 31, 69
See application file for complete search history.

(56) References Cited

U.S. PATENT DOCUMENTS

| | | | |
|---|---|---|---|
| 7,580,094 B2 | 8/2009 | Wang et al. | |
| 7,643,114 B2 | 1/2010 | Lee et al. | |
| 8,405,292 B2 * | 3/2013 | Nomura | B29D 11/00634 313/111 |
| 9,070,900 B2 * | 6/2015 | Tanaka | H01L 51/5237 |
| 2003/0063239 A1 | 4/2003 | Suzuki | |
| 2010/0053727 A1 * | 3/2010 | Lee | G02B 26/02 359/295 |
| 2013/0214301 A1 * | 8/2013 | Yamada | H01L 33/08 257/88 |
| 2016/0372528 A1 * | 12/2016 | Kamura | H01L 51/0096 |
| 2017/0277000 A1 | 9/2017 | Shi et al. | |

OTHER PUBLICATIONS

PCT International Search Report and Written Opinion, PCT Application No. PCT/US2018/038982, dated Dec. 26, 2018, ten pages.

* cited by examiner

*Primary Examiner* — Dao H Nguyen
(74) *Attorney, Agent, or Firm* — Fenwick & West LLP (57) ABSTRACT

A display device includes a thin film transistor (TFT) substrate, an overcoat layer on an upper substrate, and a reflective layer on the overcoat layer. The TFT substrate covers a light guide plate and includes TFTs configured to drive pixels of the display device. The reflective layer on the overcoat layer reflects light output from the light guide plate towards a viewing surface of the display device. The reflected light overlaps a portion of a non-active area between the active areas of pixels of the display device in at least one dimension.

20 Claims, 9 Drawing Sheets

DISPLAY DEVICE WITH OPTICAL REFLECTING LAYER FOR REDUCTION OF SCREEN DOOR EFFECT

CROSS REFERENCE TO RELATED APPLICATION

This application claims the benefit of U.S. Provisional Application No. 62/652,171 filed on Apr. 3, 2018, which is incorporated by reference in its entirety.

BACKGROUND

This disclosure relates generally to display devices, in particular to reducing a screen door effect for display devices.

Electronic displays include a plurality of pixels, which may each include a plurality of sub-pixels (e.g., a red sub-pixel, a green sub-pixel, etc.). Arrangement of individual sub-pixels may affect the appearance and performance of an electronic display device. A sub-pixel includes both an emission (i.e., active) area and a non-emission (i.e., non-active) area, and the fill factor of the sub-pixel describes the ratio of light emission area versus total area of the sub-pixel. The non-emission areas thus limit the fill factor of each sub-pixel. Additionally, some arrangements of sub-pixels may increase fixed pattern noise under certain conditions. For example, magnification of a pixel may result in non-emission areas between individual sub-pixels of the pixel becoming visible to the user, resulting in a "screen door" pattern (i.e., an increase in fixed pattern noise) in an image presented to a user. Such a phenomena is known as a screen door effect, in which the non-emission areas separating subpixels of a display device become visible in the displayed image.

Head-mounted displays (HMDs) can include an electronic display. HMDs may also include optics to magnify images from the electronic display to increase a field of view to a user. Thus, HMDs with display devices may have problems with a screen door effect, in which non-active areas separating subpixels or pixels of a display device become visible in the displayed image.

SUMMARY

Embodiments relate to a display device with a reflective layer to reduce a screen door effect for the display device. An overcoat layer on an upper substrate includes recessed areas, and the reflective layer covers at least a portion of the recessed areas. The reflective layer reflects light from sub-pixels of the display device to cover a portion of a non-active area between active areas of sub-pixels of the display device. The reflective layer can be used in place of a black matrix layer (e.g., absorptive layer) or in conjunction with a black matrix layer (e.g., absorptive layer) of the display device.

The reflective layer reflects a portion of light output from the lower structure to cover a portion of a non-active area between active areas of the sub-pixels. The lower structure includes a plurality of sub-pixels. Each sub-pixel of the lower structure may correspond to a liquid crystal cells and/or light sources.

A portion of the light from the lower structure is incident on the reflective layer is reflected to cover a portion of a non-active area between active areas of the sub-pixels. Thus, light from a pixel of a display device with the reflective layer can cover a larger area compared to light from a pixel of a display device without the reflective layer. The display device with the reflective layer increases a fill factor of the pixels of the display device and reduces a screen door effect of the display device. The display device with the reflective layer can also increase an efficiency of the display device, as light that may be trapped within the display device could be reflected by the reflective layer towards a viewing user.

In some embodiments, a display device includes a thin film transistor (TFT) substrate (i.e., lower substrate), an overcoat layer on an upper substrate, and a reflective layer on the overcoat layer. The lower substrate covers a light guide plate and includes TFTs to drive pixels of the display device. The reflective layer reflects light output from the light guide plate towards a viewing surface of the display device. The reflected light overlaps a portion of a non-active area between active areas of pixels of the display device in at least one dimension.

In some embodiments, a display device includes a lower substrate, a first and a second overcoat layer on an upper substrate, and a reflective layer between the first overcoat layer and the second overcoat layer. The lower substrate includes TFTs to drive pixels of the display device to emit light. The reflective layer reflects light emitted by the pixels of the display device to overlap a portion of a non-active area between active areas of pixels of the display device in at least one dimension.

BRIEF DESCRIPTION OF THE DRAWINGS

Figure (FIG. 1 is a cross sectional view of a portion of a display device with an optical reflecting layer and three overcoat layers, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Disclosed is a display device with an optical reflective layer for screen door reduction. The display device includes a reflective layer to reflect light emitted from sub-pixels of the display device towards a viewing surface of the display device to reduce a screen door effect. The display device may have a target viewing distance (i.e., a minimum distance from a display to view content). A screen door effect occurs when dark or non-active areas separating sub-pixels in a display device is visible to a viewing user in an image displayed by the display device at the target viewing distance.

The display device with a reflective layer may have an increase in fill factor of over a display device without a reflective layer. A fill factor of a sub-pixel of a display device describes the ratio of light emission area versus total area of the sub-pixel (e.g., emissive area and non-emissive area of the sub-pixel). A display device with a reflective layer may have an energy enhancement of approximately 20 percent and over a display device without a reflective layer. For example, a reflective layer may increase an effective active area of a sub-pixel by reflecting light from a sub-pixel of a lower structure to a portion of a non-active area of the sub-pixel. The reflected light could be light that would have been spread over a larger angle and/or trapped in the display device that is now allowed to exit the display device in a non-active area corresponding to the sub-pixel. Thus, as the non-active area of the sub-pixel appears to be reduced with the reflected light, and the effective active area of the sub-pixel increased, a fill factor of the display device is increased. The light from the display device with a reflective layer may also be more collimated in comparison to light from a display device without a reflective layer.

Display Device Architecture

Figure 1:
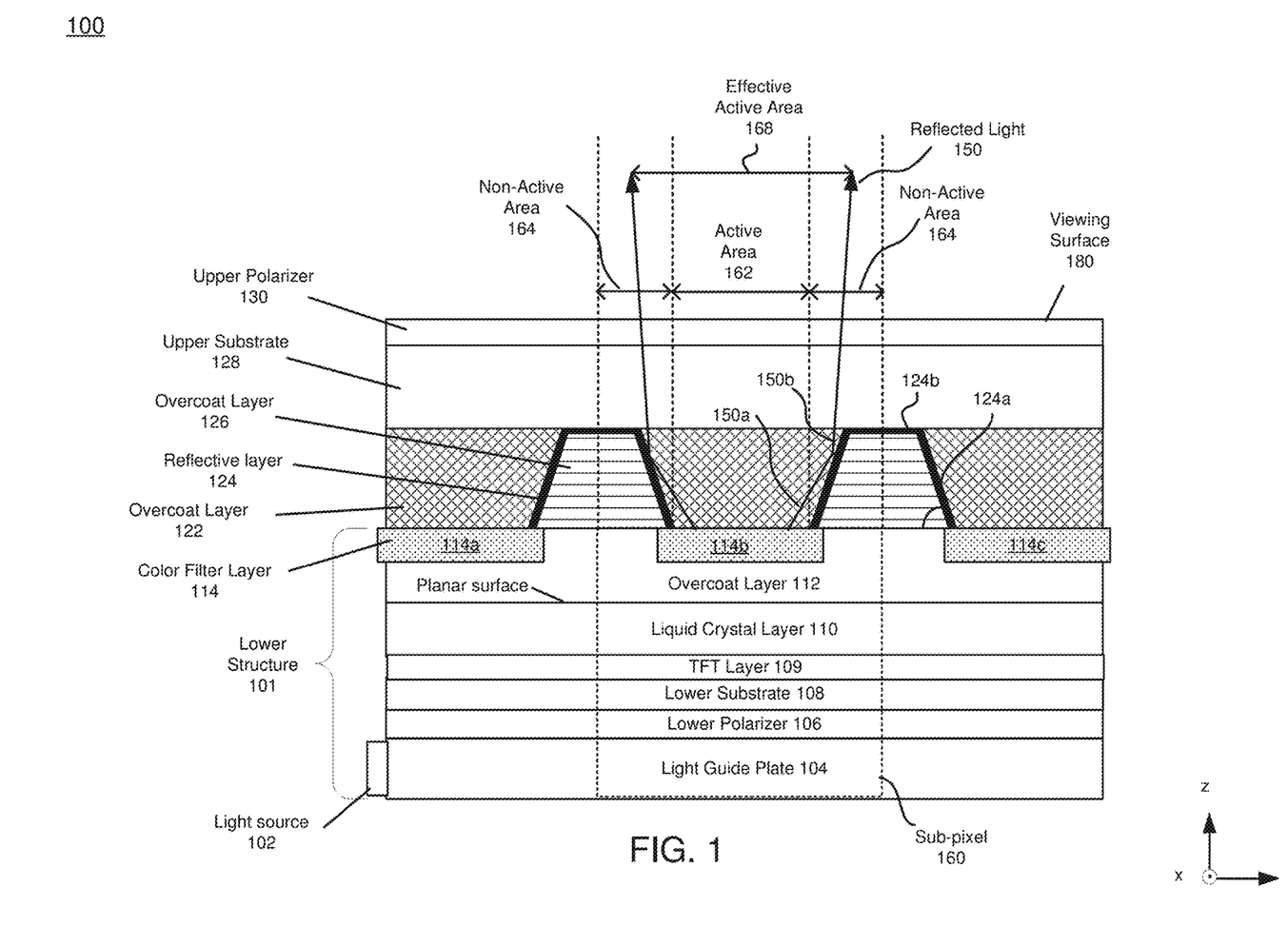

FIG. 1 is a cross sectional view of a portion of a display device 100 with an optical reflecting layer 124 and three overcoat layers 112, 120, and 126, in accordance with one or more embodiments. In other embodiments, the display device 100 comprises additional or fewer components than those described herein. Similarly, the functions can be distributed among different components and/or layers in a different manner than is described here.

The display device 100 of FIG. 1 is a LCD device and includes a lower structure 101, an overcoat layer 122, a reflective layer 124, an overcoat layer 126, an upper substrate 128, and an upper polarizer 130. The reflective layer 124 reflects light output from the lower structure 101 towards a viewing surface 122 of the display device 100 to overlap a non-active area 164 of a sub-pixel 160 to reduce a screen door effect of the display device 100. In the cross sectional view shown in FIG. 1, the reflective layer 124 is positioned between rows of sub-pixels in display device 100. An orthogonal cross section may also include a reflective layer between columns of sub-pixels of the display device. Alternatively, the reflective layer may not be between columns of sub-pixels, and a black matrix layer may be between columns of sub-pixels in the display device. The lower structure 101 includes a light source 102, a light guide plate 104, a lower polarizer 106, a lower substrate 108, a TFT layer 109, a liquid crystal layer 110, an overcoat layer 112, and a color filter layer 114. The lower structure 101 includes a plurality of sub-pixels corresponding to liquid crystal cells. In other embodiments, the lower structure 101 may include a plurality of active emissive elements. For example, instead of the lower structure 101 including a light source 102 and light guide plate 104, the lower structure 101 may include an array of active light sources. The light sources may be, e.g., vertical cavity surface-emitting lasers (VCSELs), organic light emitting diodes (OLEDs), light emitting diodes (LEDs), or some combination thereof. Each of the active light sources may correspond to a plurality of sub-pixels. In some embodiments, each of the active light sources may correspond to a single sub-pixel, and the lower structure 101 may not include a liquid crystal layer.

The light source 102 is an electrical device that is configured to emit light in a wavelength range. In some embodiments, the wavelength range includes all the wavelengths of visible light (e.g., 390-760 nm). For example, the light source may be a white LED or OLED that emits white light (e.g., contains all wavelengths in range of 390-760 nm at a same or similar intensity). Alternatively, the light source 102 may be a blue LED or a blue OLED that emits blue light (e.g., 450-495 nm) to be used with a quantum dot layer (e.g., film containing red and green quantum dots) to convert some of the emitted light to red light and green light so that the combination of colored light produces white light. Alternatively, the light source 102 may include a plurality of light sources (e.g., red, green, and blue LEDs or OLEDs) such that the combined emission from the light sources produces white light.

The light guide plate 104 is a plate that is configured to receive light from a first surface of the plate and to direct the received light to exit uniformly over a second surface of the plate. A side surface of the light guide plate 104 is coupled to the light source 102. The light guide plate 104 receives light emitted from a light source 102 from the side surface of the light guide plate 104 and directs the received light to exit uniformly over a top surface of the light guide plate 104. The light guide plate 104 may be made of acrylic, glass, or some other material that can confine light from the light source 102. A surface (e.g., bottom or top) of the light guide plate 104 includes a pattern to direct the received light to exit uniformly over the top surface of the light guide plate 104. The pattern may be a grating formed by etching lines on the surface of the light guide plate 104. A spacing of the etched lines closer to the light source 102 is greater than a spacing of etched lines further away from the light source. That is, etched lines further away from the light source 102 are spaced more closely together to produce a more uniform spreading of the light exiting the top surface of the light guide plate 104. Alternatively, a pattern may be printed with diffusive ink on a surface of the light guide plate 104, the printed pattern being denser as a distance increases from the light source 102. In some embodiments, a surface of the light guide plate is reflective. For example, a bottom surface of the light guide plate may be covered with a reflective layer (e.g., metal layer) to be 100% (or close to, effectively 100%) reflective. The reflective layer reflects light emitted from the light source 102 towards a top surface of the light guide plate 104 to exit the light guide plate 104.

In the embodiment shown in FIG. 1, the display device 100 is an edge-lit LED backlight. That is, the light source 102 is formed on an edge of the display device 100 and the light guide plate 104 directs light emitted from the light source 102 to exit uniformly out of a top surface of the light guide plate 104. In other embodiments, the display device 100 can be a back-lit LED, in which a full array of white LEDs (or red, green and blue LEDs) replace the light source 102 and light guide plate 104. A single white, red, green, or blue LED may correspond to multiple sub-pixels, and a diffusing plate may cover the array of LEDs to uniformly spread the emitted light. In some embodiments, a single white, red, green, or blue LED (or OLED) may correspond to a single sub-pixel.

The lower polarizer 106 is a polarizing filter configured to transmit light of a first polarization. The lower polarizer 106 includes a top surface and a bottom surface. The bottom surface of the lower polarizer 106 faces a top surface of the light guide plate 104 and receives uniform light from the top surface light guide plate 104. The lower polarizer 106 allows light of a first polarization to pass through the polarizing filter to exit a top surface of the polarizing filter.

A lower substrate 108 is a transparent material such as glass or plastic configured to transmit light and support other layers that are deposited and processed on it. The lower substrate 108 includes a top surface and a bottom surface. The bottom surface of the lower substrate 108 faces a top surface of the lower polarizer 106 and receives light of a first polarization exiting the top surface of the lower polarizer 106. The lower substrate 108 transmits light of a first polarization to exit out a top surface of the lower substrate 108.

In the illustrated embodiment, the TFT layer 109 provides power to liquid crystal cells in the liquid crystal layer 110. A liquid crystal cell is liquid crystal material in a corresponding sub-pixel of the display device 100. The TFT layer 109 is deposited on the top surface of the lower substrate 108. The TFT layer 109 may include semiconductor material (e.g., amorphous silicon, polysilicon, oxide semiconductor, organic semiconductor), source, drain, and gate material (e.g., metal or conductive oxide), and insulating materials (e.g., oxide, high-k dielectric material, parylene). The TFT layer 109 may include a planarizing material (e.g., overcoat layer) to cover the plurality of TFTs formed on the lower substrate 108 and form a planar top surface of the TFT layer 109. In some cases, an overcoat layer is formed as a top surface the TFT layer 109 and is further for alignment of a liquid crystal material in a liquid crystal layer 110 adjacent to the TFT layer 109. The TFT layer 110 includes a plurality of driving TFTs that are configured to provide power to one or more liquid crystal cells in the liquid crystal layer 114. The TFTs includes a conductive anode and cathode that may be part of the TFT layer 109 and/or the liquid crystal layer 110. In some embodiments, some or all of the TFTs are made of opaque materials, and formed in regions of the display device 100 corresponding to a non-active area 164 of the display device 100. In some embodiments, some or all of the TFTs are composed of materials that are at least partially transparent to light emitted by the emission devices 435. For example, Indium Tin Oxide or some other transparent conductive material may be used instead of opaque metals in the TFTs.

The liquid crystal layer 110 includes liquid crystal material that changes in orientation responsive to application of an electric field. The liquid crystal layer 110 has a top surface and a bottom surface. A bottom surface of the liquid crystal layer 110 is formed on a top surface of the TFT layer 109. The lower substrate 108 and TFT layer 109 transmits light of the first polarization (exiting the lower polarizer 106) to a bottom surface of the liquid crystal layer 110. An electric field may be applied across electrodes of a one or more sub-pixels to change an orientation of the liquid crystal material in a corresponding portion of the liquid crystal layer 110. Changing the orientation of the liquid crystal material can change the polarization of light that is transmitted through the liquid crystal layer 110. In the example shown in FIG. 1, light of a first polarization incident on a bottom surface of the liquid crystal layer 110 is changed to light of a second polarization (e.g., by applying an electric field to the liquid crystal layer 110) so that light of the second polarization exits the top surface of the liquid crystal layer 110. In this way, a polarization of light exiting the top surface of the liquid crystal layer 110 can be controlled by application of an electric field to include different amounts of light of a second polarization.

An overcoat layer 112 is a transparent material for planarizing a surface. In this embodiment, the overcoat layer covers a color filter layer 114 to provide a planar surface for liquid crystal material. The overcoat layer 112 can be made of an acryl material. A bottom surface of the overcoat layer 112 is a planar surface facing a top surface of the liquid crystal layer 110. The bottom surface of the overcoat layer 112 receives light of a second polarization exiting the liquid crystal layer 110. The received light of a second polarization exits a top surface of the overcoat layer 112.

A color filter layer 114 includes a plurality of color filters 114a, 114b, and 114c. Although only three color filters are shown in the illustrated portion of the display device 100 of FIG. 1, the color filter layer 114 includes many more color filters (e.g., a color filter for each sub-pixel of the display device 100). The color filters 114a, 114b, and 114c shown in this cross section taken in a column direction (e.g., y-direction) of a display device 100 would correspond to color filters of a same color (e.g., all red in a same column of sub-pixels), and color filters in an adjacent cross section (e.g., neighboring column of sub-pixels in a y-direction) can correspond to color filters of a different color (e.g., all green or all blue). For cross sections shown along an x-direction, the adjacent color filters may correspond to different colors (e.g., red, green, and blue color filters). A bottom surface of the color filter layer 114 faces a top surface of overcoat layer 112 to receive light of a second polarization. Each color filter 114a, 114b, 114c allows wavelengths of light in a particular range (i.e., color band) to be transmitted through the filter and blocks wavelengths of light outside of the color band from being transmitted through the filter. The color filters 114a, 114b, and 114c may be associated with a same color band (e.g., red color band). Alternatively, the color filters 114a, 114b, and 114c may be associated with a first color band, a second color band, and a third color band, respectively (e.g., red, green, and blue color band). Each color filter may be formed by depositing and patterning a colored photoresist that contains absorptive pigments. An absorptive pigment from a color filter absorbs light from wavelength range outside of the color band of the color filter, preventing the light outside the color band from being transmitted through the color filter. The light exiting the color filter layer 114 is light of a second polarization in a color band of the color filter.

The overcoat layers 122 and 126 are transparent materials that are configured to transmit light, and the reflective layer 124 reflects light 150 output from the lower structure 101 towards a viewing surface 180 of the display device 100. The first over coat layer 122 provides a shape for the reflective layer 124. The overcoat layer 126 and provides a planar surface for formation of the color filter layer 114. The overcoat layer 122 is formed on the upper substrate 128 and includes a plurality of recessed areas, and the reflective layer 124 covers the recessed areas. The recessed areas in the overcoat layer 122 forms an angle with a surface of the overcoat layer 122. Similarly, the reflective layer 124 covering the recessed areas also forms a same angle with the surface of the overcoat layer 122. As such, the recessed areas of the overcoat layer 122 provides a shape for the reflective layer 124. An overcoat layer 126 covers the reflective layer 124 in the recessed areas of the overcoat layer 122 and forms a same planar surface with the overcoat layer 122. The overcoat layer 122 and the overcoat layer 126 may be three to fifteen micrometers or more in thickness. The overcoat layer 122 and the overcoat layer 126 provide a planar surface so that the color filter layer 114 can then be easily formed on the planar surface. A bottom surface of the overcoat layer 122 faces a top surface of a color filter layer 114. The overcoat layer 112 covers the color filter layer 114 to form a planar surface for the liquid crystal layer 110, as previously mentioned. The overcoat layers 122, 126, and 112 may be made of acryl or other transparent material, and may have an index of refraction that is the same as the index of refraction of the upper substrate 128. In some embodiments, the overcoat layer 122, overcoat layer 120, and overcoat layer 112 may be referred to as the first overcoat layer, second overcoat layer, and third overcoat layer respectively.

The reflective layer 124 reflects light output from the lower structure 101 to reduce a screen door effect of the display device 100. The reflective layer 124 is formed in the recessed areas to form a similar shape of the recessed areas. A surface 124a of the reflective layer 124 forms a same angle as a recessed area to a planar surface of the overcoat layer 122 and the overcoat layer 126. A surface 124b of the reflective layer 124 is parallel to a surface of the upper substrate 128. The surface 124b may act as a black matrix for the display device 100 to prevent light leakage (e.g., preventing stray light from exiting the display device 100) in the non-active area of the display device 100. A black matrix is an opaque layer that prevents light from leaking in a non-active area of a display device. The black matrix can be an absorptive coating including absorptive particles to absorb light, a reflective layer that reflects light, or some combination thereof. The reflective layer 124 can be made of any material that is reflective to the light from the lower structure 101. For example, the reflective layer 124 may be a metal and/or metal film (e.g., silver, aluminum, gold, etc.).

The upper substrate 128 is a transparent material such as glass or plastic and includes a top surface and a bottom surface. The upper substrate 128 and the overcoat layers 112, 120, and 126 may have a same index of refraction. The bottom surface of the upper substrate 128 faces a top surface of the overcoat layer 126 and receives the reflected light transmitted through the overcoat layer 126.

The upper polarizer 130 is a polarizing filter configured to transmit light of a second polarization. The upper polarizer 130 covers a top surface of the upper substrate 128 and receives the reflected light transmitted through the upper substrate 128. The upper polarizer 130 allows light of a second polarization to pass through the polarizing filter to exit an upper surface of the polarizing filter. A second polarization of the upper polarizer 130 is different from the first polarization of lower polarizer 106. The upper and lower polarizers 130 and 106 may be a same type of polarizing filter, and the axes of transmission of the two polarizing filters may be oriented perpendicular to each other in the display device 100.

In some embodiments, the upper polarizer 130 may act as an encapsulation layer. In alternate embodiments, the display device 100 may further include the encapsulation layer on formed on top of the upper polarizer 130. The encapsulation layer protects the display device 100 from environmental factors (e.g., dust, water, etc.). The encapsulation layer is transparent to the light emitted from the display device 100, and may be formed from, e.g., transparent glass, sapphire, plastic, polarizer, some other material that is transparent to the light emitted by emission devices, or some combination thereof.

Light 150a exits the lower structure 101 out of a top surface of a color filter layer 114. The bottom surface of the overcoat layer 122 receives light 150a of a second polarization in a color band of a corresponding color filter exiting the lower structure 101. The light 150a of a second polarization in a color band is transmitted through the overcoat layer 126 to be incident on surface 124a of the reflective layer 124. The reflective layer 124 reflects the light 150b towards an upper surface of the overcoat layer 122. The reflected light 150 covers a portion of a non-active area 164 of the sub-pixel 160.

A sub-pixel 160 includes an active area 162 and a non-active area 164. The active area 162 corresponds to an area of sub-pixel 160 in which light is emitted from the lower structure 101. The non-active area 164 corresponds to an area of the sub-pixel 160 in which light is blocked from exiting the lower structure 101. In some embodiments, the non-active area 164 of a display device 100 may include a black matrix, TFTs (e.g., driving transistors), or wiring that is opaque or not transparent. The reflective layer 124 reflects light (e.g. reflected light 150) that is output from the lower structure 101 between adjacent recessed areas of the overcoat layer 122.

In some embodiments, a black matrix layer (not shown) may be formed in between active areas of sub-pixels to absorb light to prevent light from leaking in the non-active area. For example, the color filter layer 114 may include a black matrix layer. The black matrix layer is an opaque layer that prevents light from leaking in the non-active area. The black matrix can be an absorptive material that is a combination of different types of color filters (RGB) or be a black photolithographic material including black pigment for absorbing white light. In other embodiments, this black matrix layer (e.g., absorptive layer) may be formed to cover the reflective layer 124 in place of or before the overcoat layer 126 is formed. Alternatively, a black matrix layer could replace the portion 124b of the reflective layer 124.

The embodiment in FIG. 1 is an LCD device, but in other embodiments, the display device can be a different type of display device. For example, the display device may be a display device in which the intensities of each sub-pixels are controlled by drive TFTs. The sub-pixels may be a white light source which uses the color filter layer to filter emitted white light to light in a color band. The sub-pixels may be a blue light source with a color filter layer including a quantum dot color filter for red and green sub-pixels (e.g., red and green quantum dots for converting blue light to red and green light). Accordingly, in some embodiments, the display device may not include one or more of the following: the light source 102, the light guide plate 104, the lower polarizer 106, the liquid crystal layer 110, and the upper polarizer 130.

Figure 2:
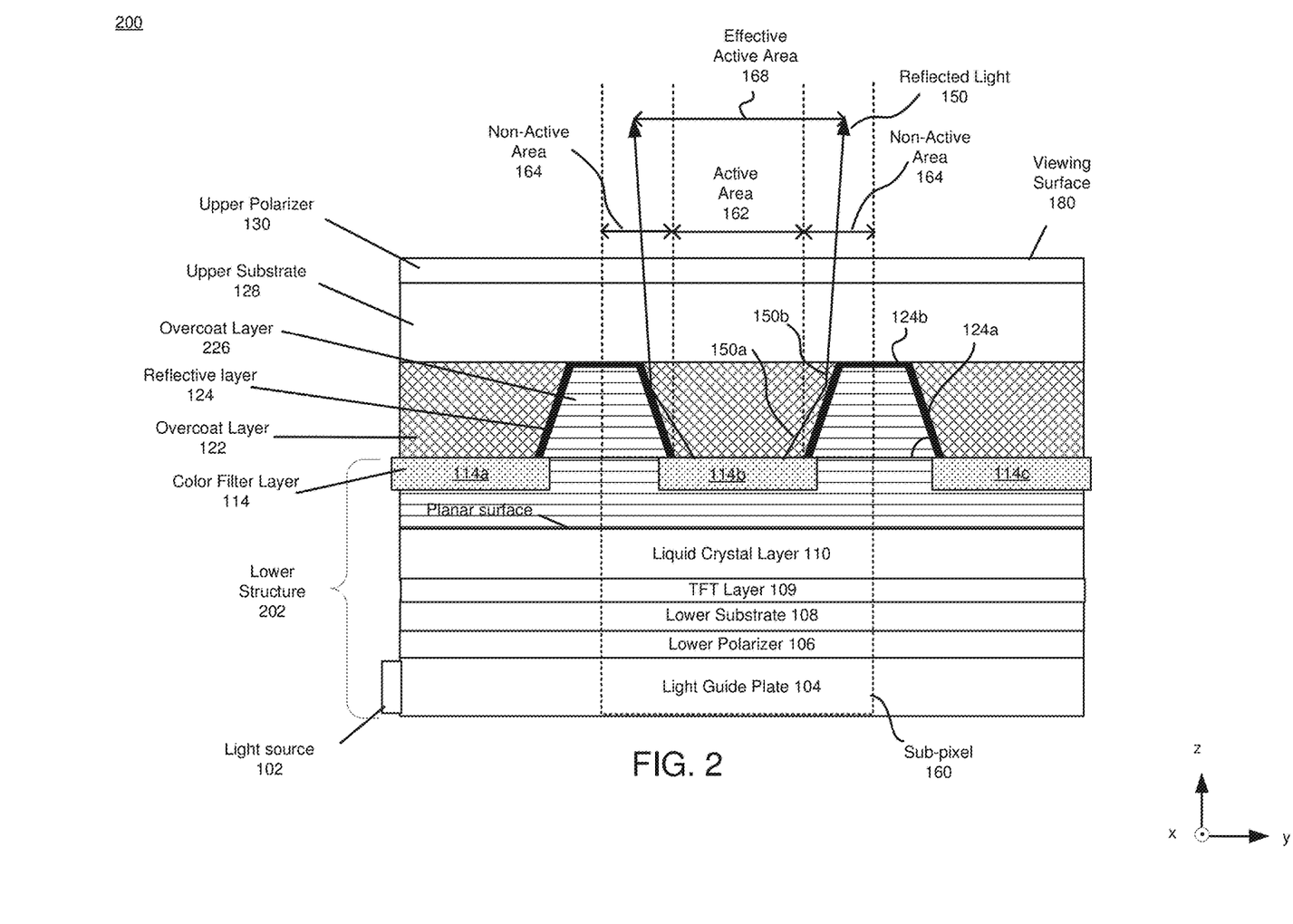
FIG. 2 is a cross sectional view of a portion of a display device with an optical reflecting layer and two overcoat layers, in accordance with one or more embodiments.

FIG. 2 is a cross sectional view of a portion of a display device 200 with an optical reflecting layer 124 and two overcoat layers, in accordance with one or more embodiments. The display device 200 of FIG. 2 is the same as the display device 100 of FIG. 1 except the overcoat layer 226 of FIG. 2 replaces the overcoat layers 126 and 112 of FIG. 1. The overcoat layer 226 covers the color filter layer 114 (e.g., color filters 114a, 114b, and 114c) and the reflective layer 124 to form a planar surface. The reflective layer 124 reflects light output from the lower structure 202 between adjacent recessed areas of the overcoat layer 122. In some embodiments, the overcoat layer 122 and overcoat layer 126 may be referred to as the first overcoat layer and second overcoat layer respectively.

Figure 3A:
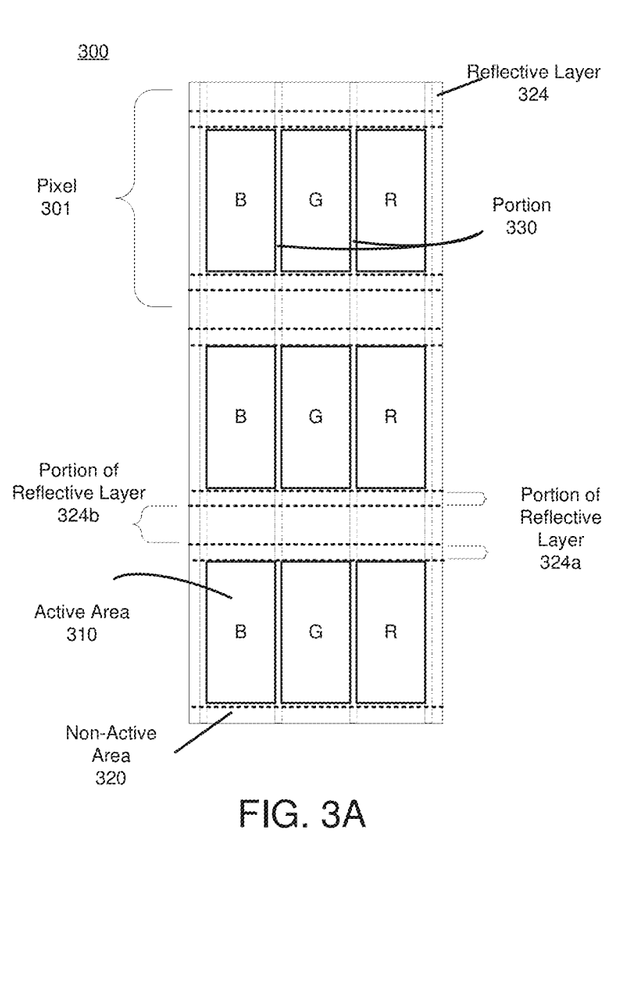
FIG. 3A is a top view of a portion of a display device with a continuous optical reflecting layer, in accordance with one or more embodiments.

FIG. 3A is a top view of a portion of a display device 300 with a continuous optical reflecting layer 324, in accordance with one or more embodiments. The display device 300 includes a plurality of sub-pixels. The portion depicted in FIG. 3A depicts only three pixels 301 (e.g., one in each row).

However, the display device 300 includes many pixels (e.g., millions of pixels). Each pixel 301 comprises a blue sub-pixel (sub-pixel B), a green sub-pixel (sub-pixel G), and a red sub-pixel (sub-pixel R). Each sub-pixel B, G, and R includes an active area 310 and a non-active area 320. A continuous optical reflecting layer 324 is between the active areas 310 of the sub-pixels B, G, and R. The reflective layer 324 includes a portion 324a and a portion 324b. The portions 324a and 324b of FIG. 3 may correspond to portions 124a and 124b of FIGS. 1 and 2, which are a cross section along a column direction (e.g., y direction). The reflective layer 324 comprising portions 324a and 324b are in between rows of pixels 301 or sub-pixels of a same color.

In the embodiment of FIG. 3, the reflective layer 324 may cover the portion of the display device 300 indicated as portion 330 shown in between the active areas 310 of the sub-pixels R, G, and B of different colors (e.g., sub pixels in a same pixel). In the embodiment shown in FIGS. 1 and 2, a reflective layer 324 does not cover a portion of the display device 300 indicated as portion 330 in between the sub-pixels R, G, and B of a same pixel. Instead, a black matrix layer covers the portion 330 of the display device.

In some embodiments, a black matrix layer (e.g., absorptive layer) is used in place of or in conjunction with a portion 324b. In some embodiments, a black matrix layer (e.g., absorptive layer) is used in place of or in conjunction with the portion 330 between the active area 310 of sub-pixels B, G, and R of a same pixel. The reflective layer 324a may be in an area between the active area of adjacent sub-pixels of a same color and a black matrix may be in an area 310 between active areas of sub-pixels of different colors.

A display device with a continuous reflective layer can have a lower resistance than a display device with a discontinuous reflective layer, and may have problems with electrostatic discharge. Additionally, a display device with a continuous reflective layer may have a greater risk of statistic mura (e.g., luminance non-uniformity) in the display device.

Figure 3B:
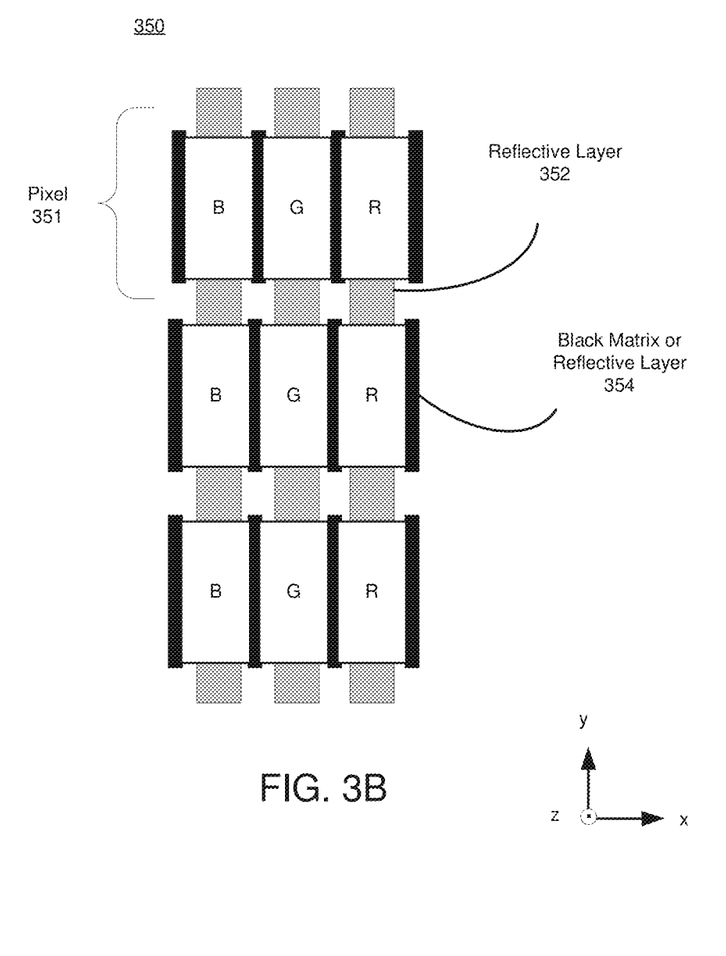
FIG. 3B is a top view of a portion of a display device with a discontinuous optical reflecting layer, in accordance with one or more embodiments.

FIG. 3B is a top view of a portion of a display device 350 with a discontinuous optical reflecting layer 352, in accordance with one or more embodiments. In one embodiment, the reflective layer 352 in regions between the active areas of adjacent sub-pixels of a same color. A black matrix or a reflective layer 354 is in regions between the active areas of sub-pixels of a different color. A reflective layer 352 that is discontinuous in structure may reduce the risk of the display device having problems with electrostatic discharge and mura. The reflective layer 352 may be made discontinuous in a region of the reflective layer that vertically overlaps a portion of the lower substrate including TFTs or opaque elements. In this way, the reflective layer 352 may be discontinuous in regions that may not require the reflective layer to function as a black matrix (e.g., in regions of the lower substrate that are already light-blocking).

Figure 3C:
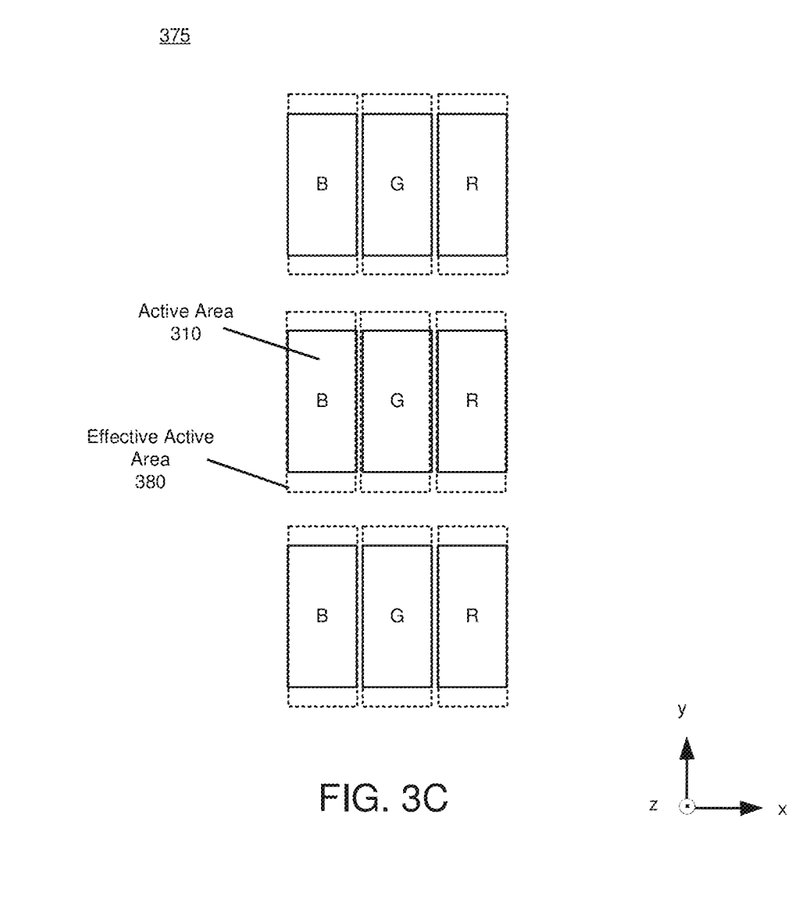
FIG. 3C is a top view of a portion of a display device with an optical reflecting layer illustrating an effective active area, in accordance with one or more embodiments.

FIG. 3C is a top view of a portion of a display device with an optical reflecting layer illustrating an effective active area 380. The effective active area 380 may correspond to the effective active area 168 shown in FIGS. 1 and 2. The active area 310 may correspond to active area 162 shown in FIGS. 1 and 2. The effective active area 380 is increased in a column direction from active area 310.

Figure 4:
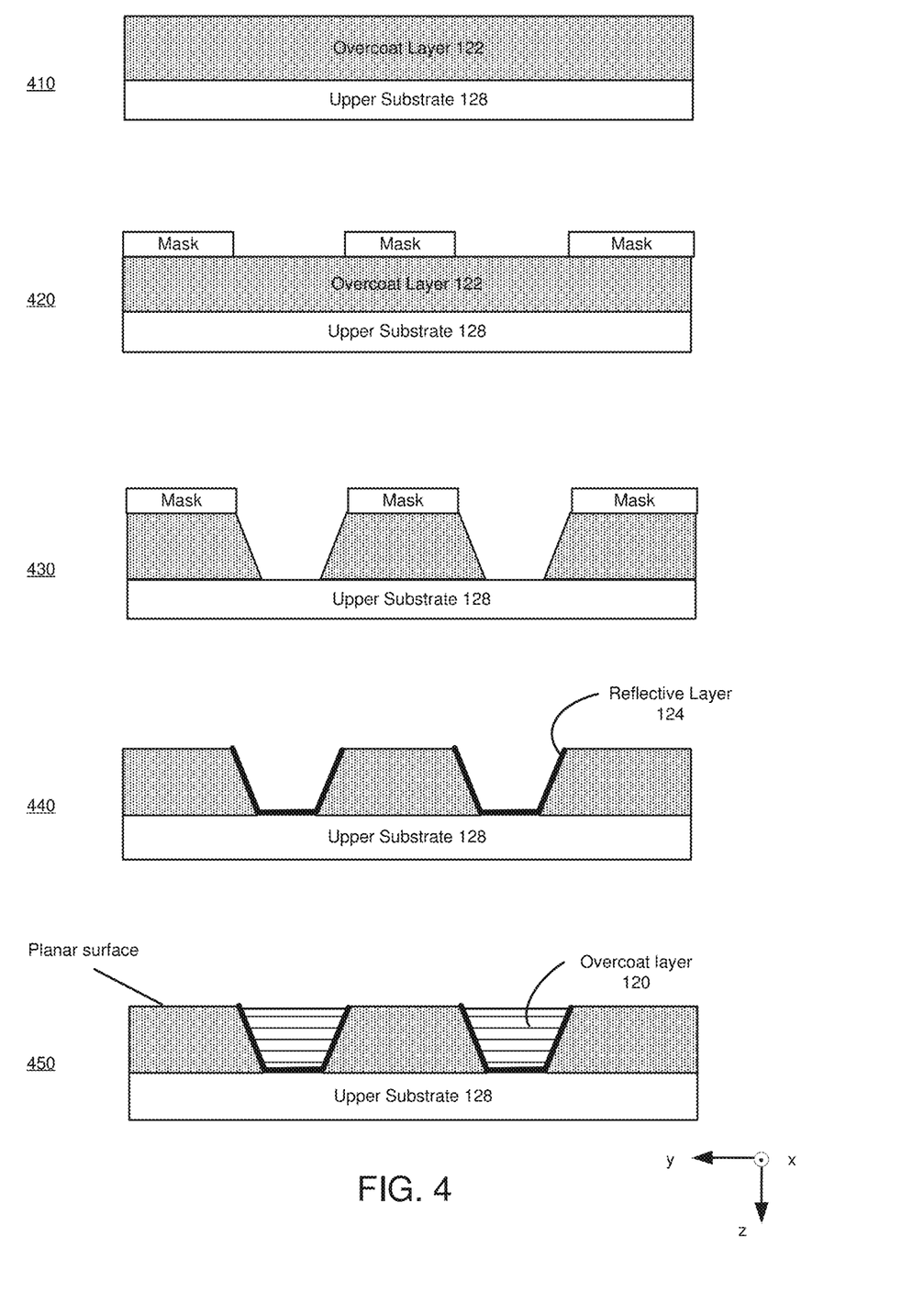
FIG. 4 illustrates an example process for fabricating an optical reflecting layer of a display device, in accordance with one or more embodiments.

FIG. 4 illustrates an example process for fabricating an optical reflecting layer of a display device, in accordance with one or more embodiments. This example is merely illustrative, and other processes may be used to form the optical reflecting layer of the display device. Likewise, embodiments may include different and/or additional steps, or may perform the steps in different orders.

An overcoat layer 122 is formed 410 on the upper substrate 128. A mask is formed 420 on the overcoat layer 122. The mask may be made by depositing photoresist, exposing photoresist through a photo mask, and developing the photoresist. The overcoat layer 122 is etched 430 to form recessed areas in the overcoat layer 122. A reflective layer 124 is deposited over the mask, the overcoat layer 122, and the upper substrate 128. The mask is removed so that a reflective layer 124 remains 440 in the recessed areas in the overcoat layer 122 but is absent from other surfaces of the overcoat layer 122. An overcoat layer 120 is deposited 450 over the reflective layer 124 to form a planar surface with the overcoat layer 122. Thus, the optical reflecting layer is fabricated on an upper substrate 128 of a display device 100. Subsequent processing steps on the upper substrate 128 after the formation of the optical reflecting layer can include the formation of the color filter layer 114 and an overcoat layer 112 to form a planar surface to face a liquid crystal layer 110. The upper substrate 128 including the reflective layer 124 can be used in an LCD display as shown, for example, in FIG. 1. The reflective layer 124 reflects light output from the lower structure 101 to overlap a non-active area of a sub-pixel to reduce a screen door effect of the display device.

Figure 5:
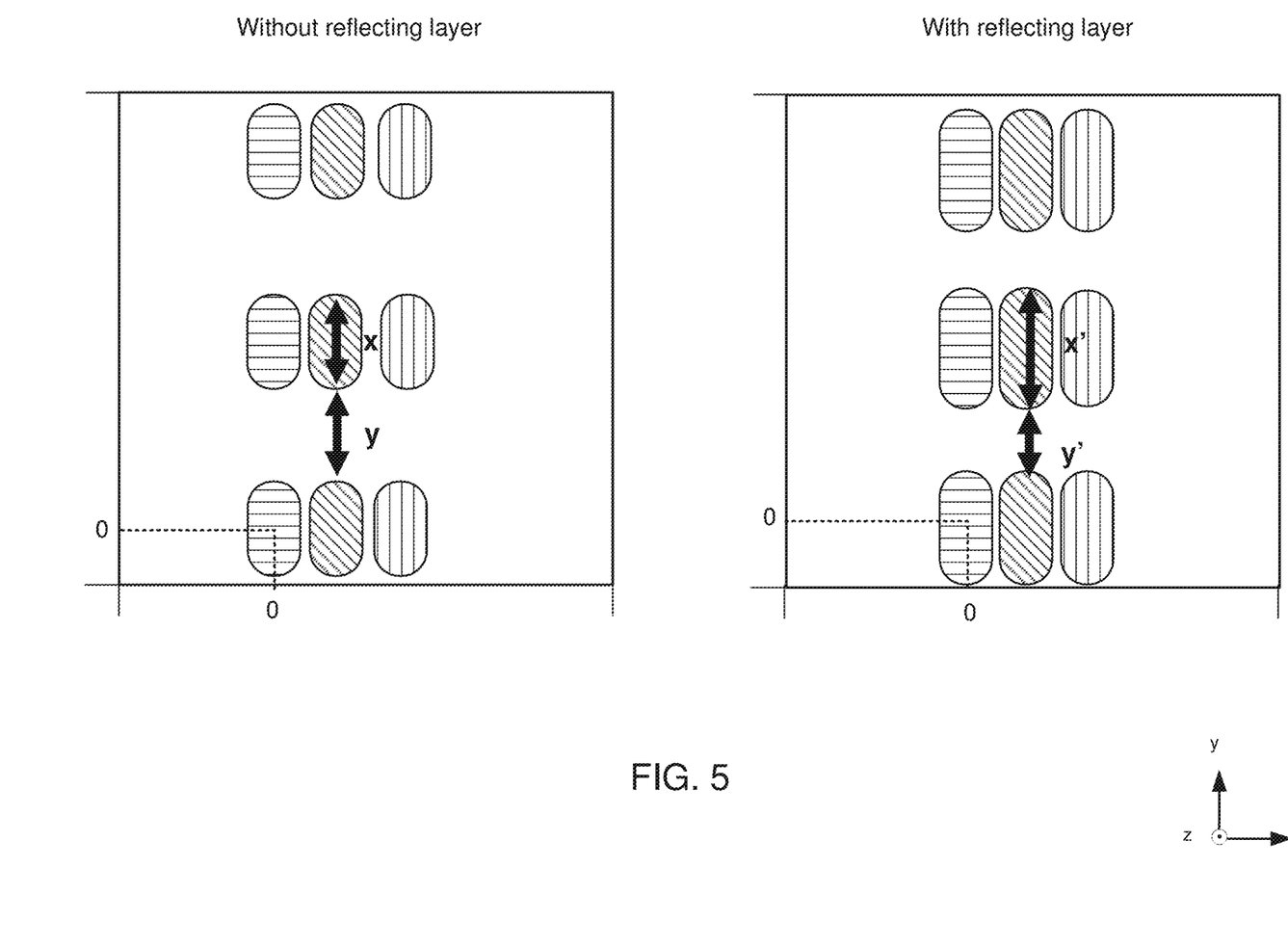
FIG. 5 illustrates a reduction in a screen door effect of a display device with an optical reflecting layer, in accordance with one or more embodiments.

FIG. 5 illustrates a reduction in a screen door effect of a display device with an optical reflecting layer, according to one or more embodiments. FIG. 5 depicts a similar configuration to FIG. 3C except FIG. 5 is a representation a simulation result of a display device with a reflecting layer in comparison to a display device without a reflecting layer. FIG. 5 includes three rows of pixels that each have three sub pixels (e.g., B, G, and R). In a display device without a reflecting layer (e.g., left image), a height of an active area of a sub-pixel is x, and a height of a non-active area between active areas of sub-pixels of a same color is y. In a display device with a reflecting layer, the height of an active area of a sub-pixel appears to increase to x', and the height of a non-active area between active areas of sub-pixels of a same color appears to decrease to y'. For example, a height of the active area may appear to increase from 23 micrometers in a display device without a reflecting layer to a height of 30 micrometers in a display device with a reflecting layer. The height of the non-active area between active areas of sub-pixels of a same color may appear to decrease from 23 micrometers in a display device without a reflecting layer to 16 micrometers in a display device with a reflecting layer. This can result in an increase of approximately 30% in the vertical direction of the active area of the sub-pixel. Overall, the fill factor of the sub-pixel may increase approximately 20%.

Figure 6A:
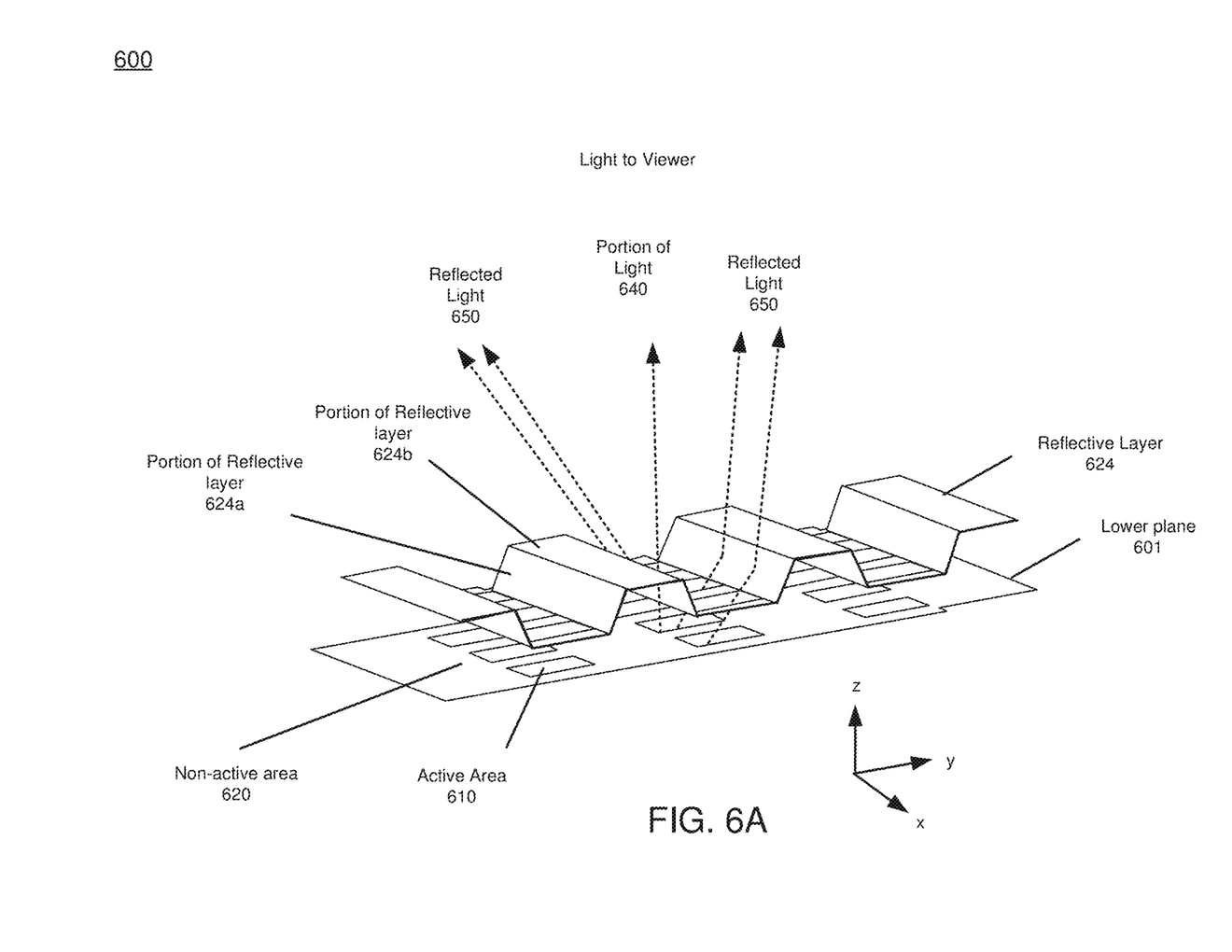
FIG. 6A is an example isometric view of a portion of a display device with an optical reflecting layer, in accordance with one or more embodiments.

FIG. 6A is an example isometric view of a portion of a display device 600 with an optical reflecting layer 624, according to one or more embodiments. The reflective layer 624 can be a same reflective layer as reflective layer 124 in FIGS. 1 and 2. A lower plane 601 shown in FIG. 6A depicts active area 610 and non-active area 620 of sub-pixels in a lower structure of a display device. A portion of light 650 from the active area 610 of a sub-pixel from the lower plane 601 reflects off a portion 624a the reflective layer 624 towards a viewing user. A portion of light 640 from the active area 610 of lower plane 601 may pass directly through openings in the reflective layer 624.

Figure 6B:
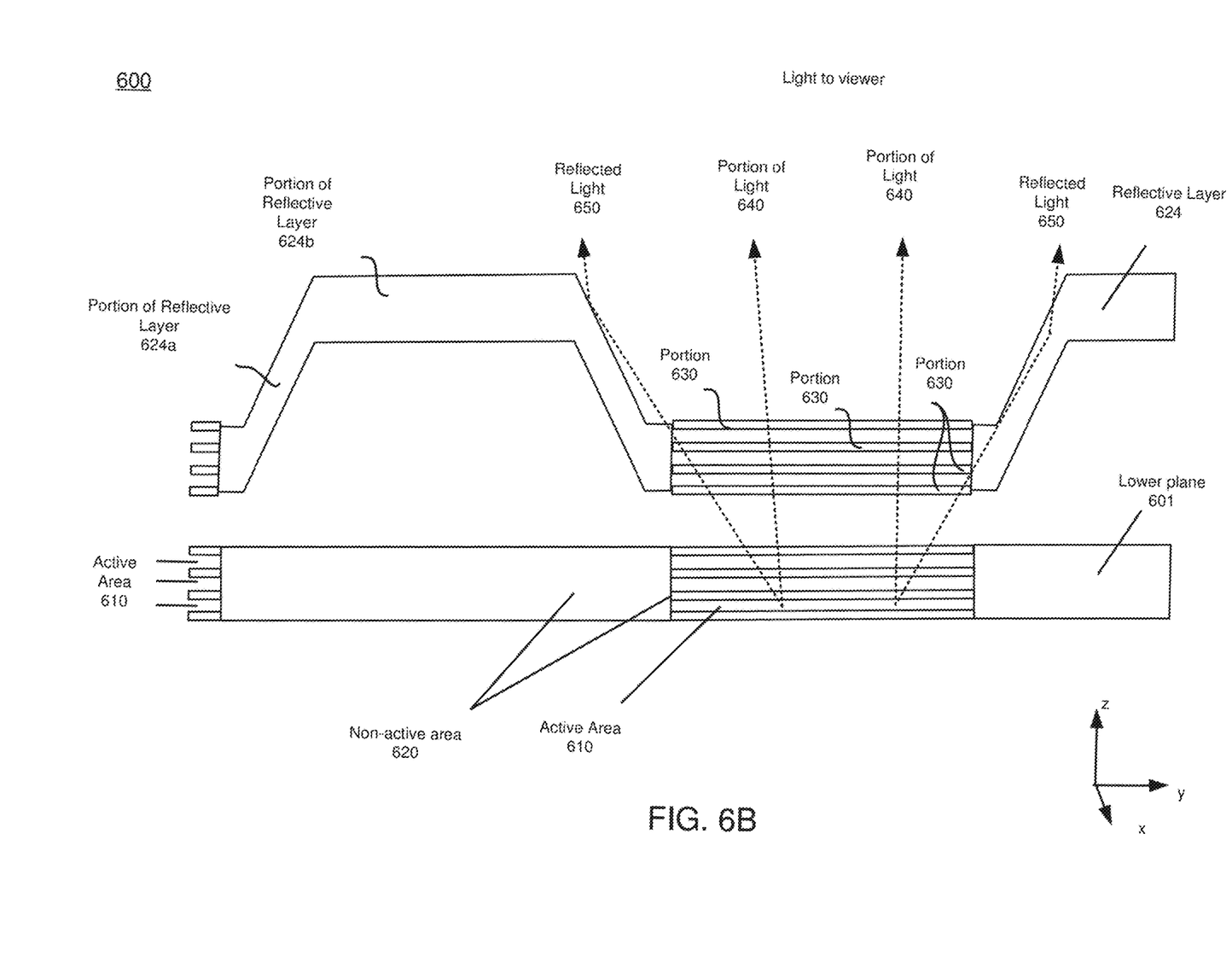
FIG. 6B is an example isometric view of a portion of a display device with an optical reflecting layer, in accordance with one or more embodiments.

FIG. 6B is an example isometric view of a portion of a display device 600 with an optical reflecting layer 624, according to one or more embodiments. In FIG. 6B, the portions 630 corresponding to non-active area in between sub-pixels of a different color can be more clearly seen. The portions 630 may correspond to portions 330 as shown in FIG. 3A which may correspond to a black matrix layer in between sub-pixels of different colors (e.g., between sub-pixels of a same pixel).

Figure 6C:
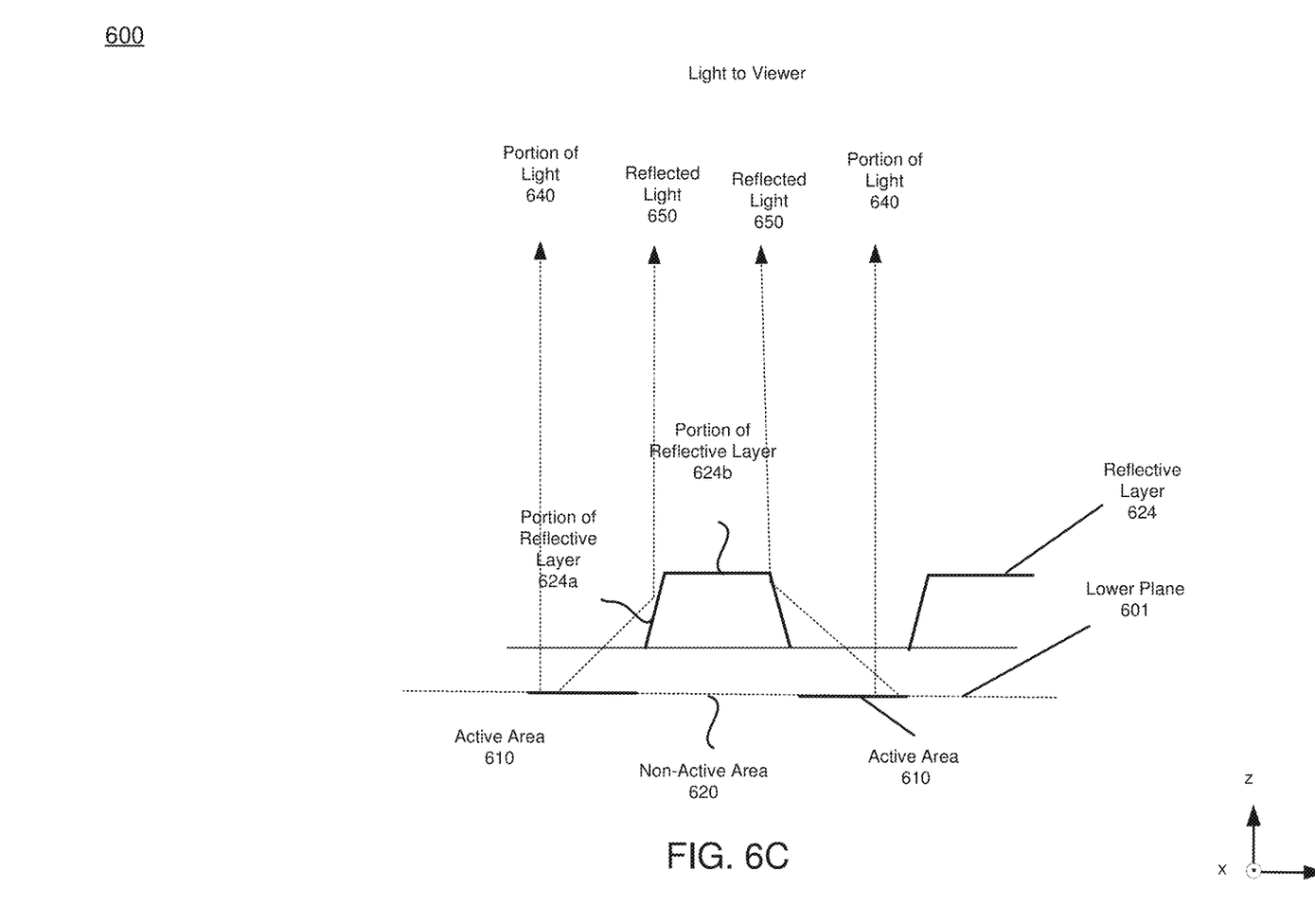
FIG. 6C is an example side view of a portion of a display device with an optical reflecting layer, in accordance with one or more embodiments.

FIG. 6C is an example side view of a portion of a display device 600 with an optical reflecting layer 624. The side view shown in FIG. 6C is a cross section that is taken across a region of the reflective layer 624 corresponding to active area 610 of the lower plane 601. An active area 610 corresponds to a region not covered by the reflective layer 624. The active area 610 also corresponds to a region not covered by portions 630 shown in the reflective layer 624 that may correspond to a black matrix layer between sub-pixels. A portion 624a of the reflective layer 624 reflects light 650 from the active area 610 of the lower plane 601 to cover portions of a non-active area 620. The light 640 from the active area 610 of the lower plane 601 directly passes through openings in the reflective layer 624.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device comprising:
a thin film transistor (TFT) substrate covering a light guide plate including a plurality of TFTs configured to drive pixels of the display device;
an overcoat layer on an upper substrate,
a reflective layer on the overcoat layer, the overcoat layer configured to receive light directly output from a lower structure, and the reflective layer configured to directly reflect the received light directly output from the lower structure towards a viewing surface of the display device, the reflected light exiting the viewing surface and overlapping a portion of a non-active area between active areas of the pixels of the display device in at least one dimension, wherein the lower structure includes the TFT substrate and the light guide plate, and the reflective layer is between the lower structure and the upper substrate.

2. The display device of claim 1, wherein the overcoat layer is patterned to include a plurality of recessed areas, and wherein the reflective layer covers at least a portion of the recessed areas.

3. The display device of claim 2, further comprising a second overcoat layer covering the reflective layer, wherein the second overcoat layer is configured to form a planar surface with the overcoat layer.

4. The display device of claim 3, wherein a color filter layer is on the planar surface, and a third overcoat layer is configured to form a planar surface covering the color filter layer.

5. The display device of claim 4, wherein the color filter layer is between the overcoat layer and the third overcoat layer.

6. The display device of claim 2, further comprising a second overcoat layer covering the reflective layer, wherein the second overcoat layer is configured to form a planar surface covering a color filter layer on the overcoat layer.

7. The display device of claim 2, wherein the reflective layer is configured to reflect light output from the light guide plate and transmitted by a liquid crystal material that passes through the overcoat layer between adjacent recessed areas of the overcoat layer.

8. The display device of claim 1, wherein each pixel of the display device includes a plurality of sub-pixels, the reflective layer is between active areas of adjacent sub-pixels of a same color and a black matrix layer is between active areas of adjacent sub-pixels of different colors.

9. The display device of claim 1, wherein each pixel of the display device includes a plurality of sub-pixels, and the reflective layer is between active areas of the sub-pixels.

10. The display device of claim 1, wherein each pixel of the display device includes a plurality of sub-pixels, and the reflective layer is between active areas of sub-pixels of a same color.

11. A display device comprising:
a thin film transistor (TFT) substrate including a plurality of TFTs configured to drive pixels of the display device to emit light;
a first and a second overcoat layer on an upper substrate; and
a reflective layer between the first overcoat layer and the second overcoat layer, the first overcoat layer configured to receive light directly output from a lower structure, and the reflective layer configured to directly reflect the received light directly output from the lower structure towards a viewing surface of the display device, the reflected light exiting the viewing surface and overlapping a portion of a black matrix of the display device in at least one dimension, wherein the lower structure includes the TFT substrate, and the reflective layer is between the lower substrate and the upper substrate.

12. The display device of claim 11, wherein the first overcoat layer is patterned to include a plurality of recessed areas, and wherein the reflective layer covers at least a portion of the recessed areas.

13. The display device of claim 12, wherein the second overcoat layer is configured to form a planar surface with the first overcoat layer.

14. The display device of claim 13, wherein a color filter layer is on the planar surface, and a third overcoat layer is configured to form a planar surface covering the color filter layer.

15. The display device of claim 14, wherein the color filter layer is between the first and the third overcoat layer.

16. The display device of claim 12, wherein the second overcoat layer is configured to form a planar surface covering a color filter layer on the first overcoat layer.

17. The display device of claim 12, wherein the reflective layer is configured to reflect light emitted from the pixels that passes through the first overcoat layer between adjacent recessed areas of the first overcoat layer.

18. The display device of claim 11, wherein each pixel of the display device includes a plurality of sub-pixels, the reflective layer is between active areas of adjacent sub-pixels of a same color and a black matrix layer is between active areas of adjacent sub-pixels of different colors.

19. The display device of claim 11, wherein each pixel of the display device includes a plurality of sub-pixels, and the reflective layer is between active areas of the sub-pixels.

20. The display device of claim 11, wherein each pixel of the display device includes a plurality of sub-pixels, and the reflective layer is between active areas of sub-pixels of different pixels.

* * * * *